United States Patent
Lin et al.

(10) Patent No.: US 7,105,072 B2
(45) Date of Patent: Sep. 12, 2006

(54) METHOD FOR PROCESSING A FILM

(75) Inventors: David Lin, Hsinchung (TW);
Kun-Ming Chang, Taipei (TW);
Chi-Ping Chang, Taipei Hsien (TW)

(73) Assignee: Four Pillars Enterprise Corp., Taipei Hsien (TW)

( * ) Notice: Subject to any disclaimer, the term of this patent is extended or adjusted under 35 U.S.C. 154(b) by 77 days.

(21) Appl. No.: 10/083,851

(22) Filed: Feb. 25, 2002

(65) Prior Publication Data

US 2003/0034589 A1 Feb. 20, 2003

Related U.S. Application Data

(63) Continuation of application No. 09/342,416, filed on Jun. 29, 1999, now abandoned.

(51) Int. Cl.
*B32B 31/12* (2006.01)
*B29C 59/02* (2006.01)
*B21D 31/00* (2006.01)

(52) U.S. Cl. .................. 156/219; 156/220; 156/252; 156/253; 156/289; 264/284; 264/293; 72/379.2

(58) Field of Classification Search .............. 156/209, 156/219, 220, 289, 278, 252, 253; 264/284, 264/293; 425/385; 72/379.2, 379.6
See application file for complete search history.

(56) References Cited

U.S. PATENT DOCUMENTS 3,648,358 A    3/1972   Cannady, Jr. et al.
4,091,154 A    5/1978   Hirai
4,639,341 A    1/1987   Hanamoto et al.
5,061,172 A   10/1991   Fenessy, Sr. et al.
5,182,063 A    1/1993   Lang et al.
5,271,882 A   12/1993   Shirahata et al.
5,593,632 A *  1/1997   Kagawa ................ 264/284
5,639,536 A    6/1997   Yamazaki et al.
5,641,372 A    6/1997   Okuno
5,648,107 A *  7/1997   Kagawa et al.
5,707,581 A    1/1998   Yamazaki
5,800,759 A    9/1998   Yamazaki et al.
5,853,138 A * 12/1998   Chang
6,245,182 B1   6/2001   Nakamura
6,309,582 B1  10/2001   Wu
2001/0000860 A1 5/2001  Smith et al.

FOREIGN PATENT DOCUMENTS

DE      28 30 402    *  1/1980
JP       6-71767     *  3/1994

* cited by examiner

*Primary Examiner*—Melvin Mayes
(74) *Attorney, Agent, or Firm*—J.C. Patents

(57) ABSTRACT

A method for processing a film. The method impressing the whole surface or a selected surface of the film to form protuberant structures on the film by using a transfer and an impresser which has grain projections formed thereon, wherein the protuberant structures have a protuberant shape with an opening hole on the tip or without an opening hole on the tip.

9 Claims, 16 Drawing Sheets

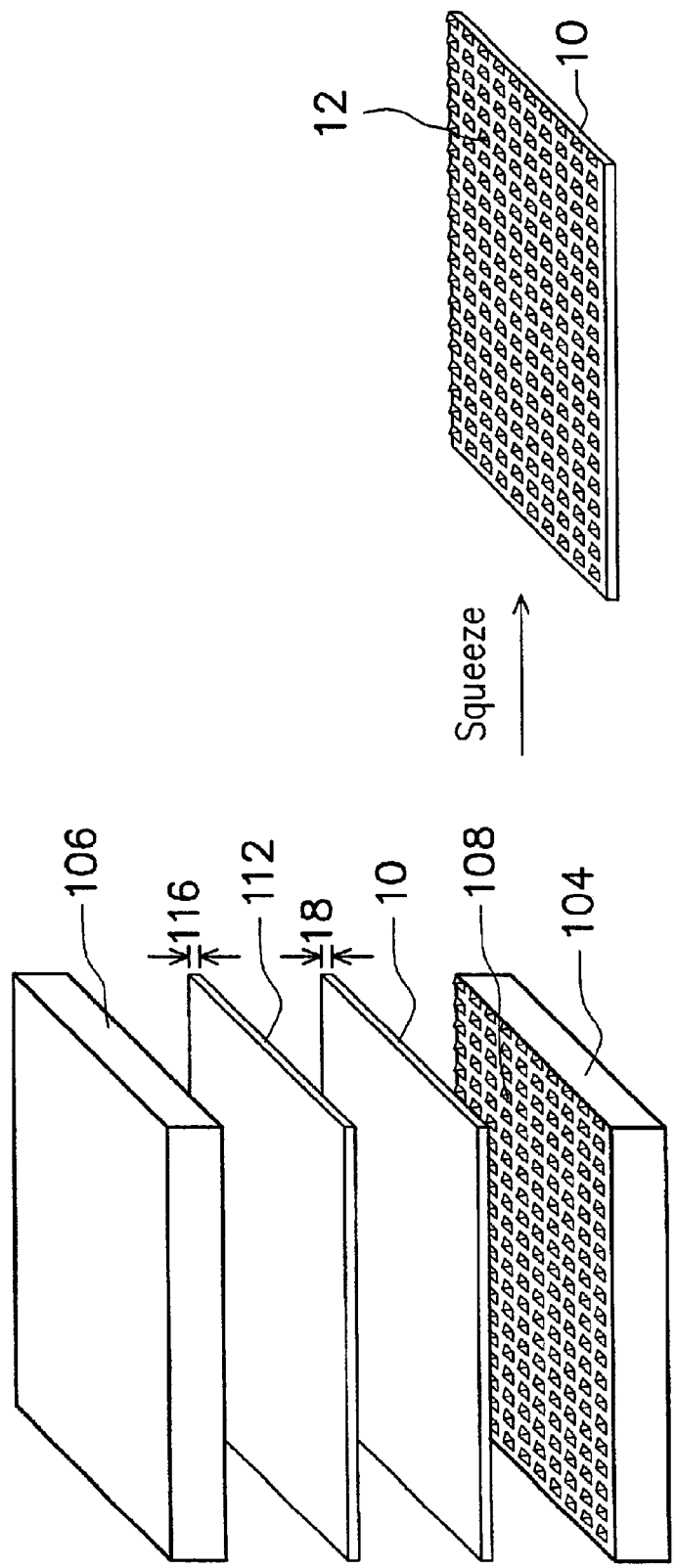

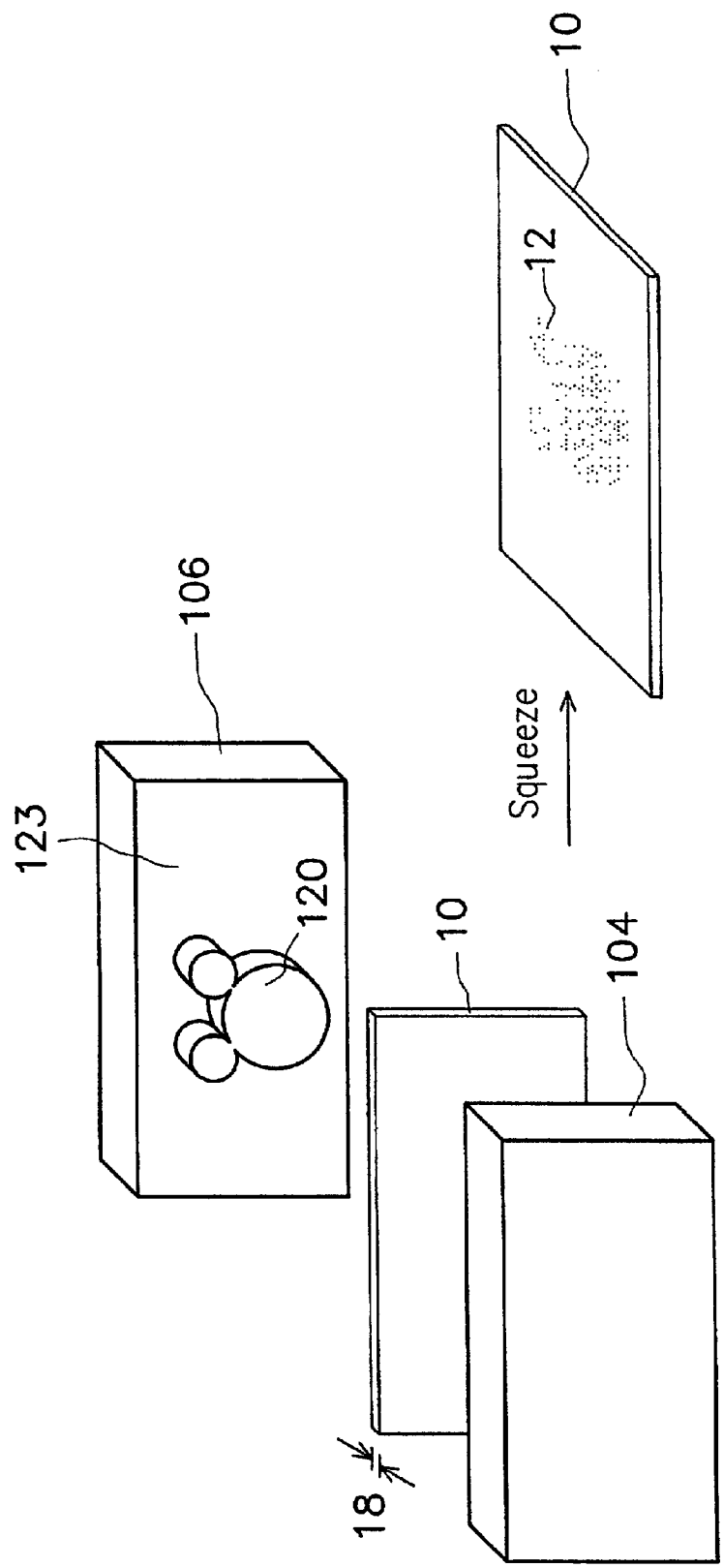

METHOD FOR PROCESSING A FILM

This application is a continuation application of, and claims the priority benefit of, U.S. application Ser. No. 09/342,416 filed on Jun. 29, 1999 now abandoned.

BACKGROUND OF THE INVENTION

1. Field of Invention

The present invention relates to a method for processing a film. More particularly, the present invention relates to a method for forming protuberant structures on the film.

2. Description of Related Art

A typical metal material is commonly used because of its special luster. For example, a signboard or a billboard for decorating is surface finished with metal and is shaped by computerized cutting to attract people's attention. Sometimes the metal is processed by special treatment to produce different feeling of sight and touch. An example of special treatment is the sandblasting treatment used to form fine grains on the surface of the metal to make different reflections and refraction of light, so that the different feelings of beauty can be produced.

However, it is hard to control the surface feature of the metal when using the sandblasting treatment. Furthermore, this sandblasting treatment causes poor uniformity and lower reproducibility, is time-consuming and manpower consuming, and the hardware of the sandblasting is quite expensive. Therefore, the sandblasting treatment has its restrictions and is not suitable for circumstances, which requires high throughput, fineness, high-quality reproduction and good uniformity.

SUMMARY OF THE INVENTION

The invention provides a method for processing the film by performing a surface treatment, such that the treated film can have various visual effects produced via the reflection of light.

The invention provides a method for processing film for providing processed film with good uniformity fine structure on the surface of the film.

The invention provides a method for processing film for providing processed film with high-quality reproduction.

As embodied and broadly described herein, the invention provides a method of processing film, which method comprises impressing the whole surface or a selected surface of the film. The impression forms protuberant structures on the film, by using a transfer and an impresser, which has, grain projections formed thereon, wherein the protuberant structures have a protuberant shape with an opening hole on the tip or without an opening hole on the tip.

According to the method of invention, the grain projections are made of diamond or Borazon. The protuberant structures or concavities are formed by an impresser, for example, a diamond or Borazon particles plated roller, a diamond or Borazon particles plated planar press or a spike-shaped roller, having protuberances. The film used in the process is made of metal, plastic, alloy, or a complex film, wherein the complex film is composed of metal, metal coupled with plastic, metal coupled with paper, metal composite foil or the like. The protuberant structures have a protuberant shape with opening or without opening on the tip.

As described above, the method for processing the film on the selected region of the film includes forming grain projections on the impresser and on the location corresponding to the region of the film. After performing the impressing step, the protuberant structures are formed on the region of the film by using the selected region diamond or Borazon particles plated impresser and the transfer, which has a flat surface. Second method includes performing the impressing step, with the protuberant structures formed on the desired region of the film by using a whole region diamond or Borazon particles plated impresser and the transfer, which has a uniform high and a step convex positive region corresponding to the region of the selected impressing region of the film. Still the third method for processing the film on the selected region of the film includes forming the grain projections on the whole surface of the diamond or Borazon particles plated impresser, and further providing a template and stacked to the film to the location between impresser and transfer. The template has a patterned region, which corresponds, to the selected region of the film for forming the protuberant structures on the region of the film after the step of performing the impressing step.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5b is a diagram showing a schematic view of performing the impression processing on the whole surface of the film according to another preferred embodiment of the present invention;

FIG. 8a is a diagram showing a schematic view of performing the impression processing on a selected region of the film by using a transfer having a region with an uniform high of convex according to one preferred embodiment of the present invention;

DESCRIPTION OF THE PREFERRED EMBODIMENTS

Figure 1:
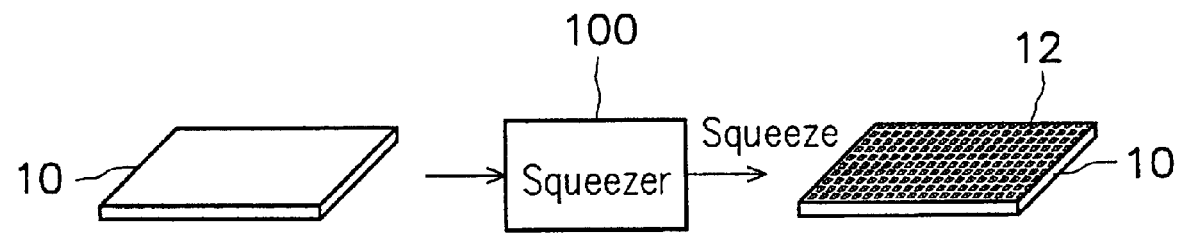
FIG. 1 is a diagram showing a schematic view of a film processing method according to one preferred embodiment of the present invention.
Figure 2:
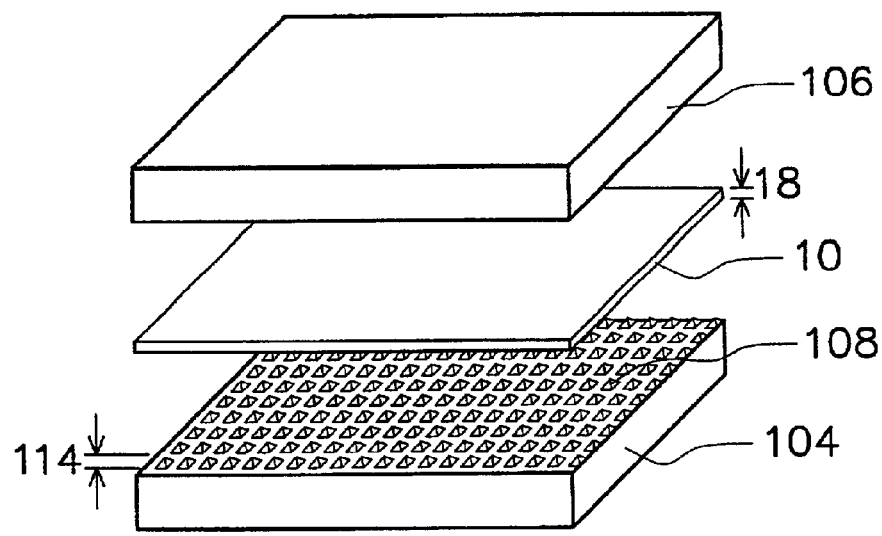
FIG. 2 is a diagram showing a schematic view of a squeezer for film processing shown in FIG. 1, according to one preferred embodiment of this invention.

Referring to FIGS. 1 and 2, a film 10, for example, thin film, is processed by a squeezer 100, and forms protuberant structures 12 on the film 10. The desirable film 10 is, for example, made of metal, plastic, alloy, or complex film, wherein the complex film is composed of different metals, metal coupled with plastic, metal coupled with paper or the like.

FIG. 2 shows the squeezer 100 applied to the manufacturing process of the present invention. Referring to FIG. 2, the squeezer 100 includes an impresser 104 and a transfer 106. Both the impresser 104 and the transfer 106 are plate-like or cylinder-like. FIG. 2 illustrates a situation that the transfer 106 is located above the plate-like impresser 104. However, the invention is not limited thereto, the impresser 104 may be located above or below the transfers 106 depending on the actual application.

Grain projections 108 with high hardness are formed on the impresser 104 for forming protuberant structures 12 on the film 10. During the impression processing, the film 10 is placed on the impresser 104. The film 10 is then impressed between the impresser 104 and the transfer 106. As a result of the process, the protuberant structures 12 are formed on the film 10.

Figure 3:
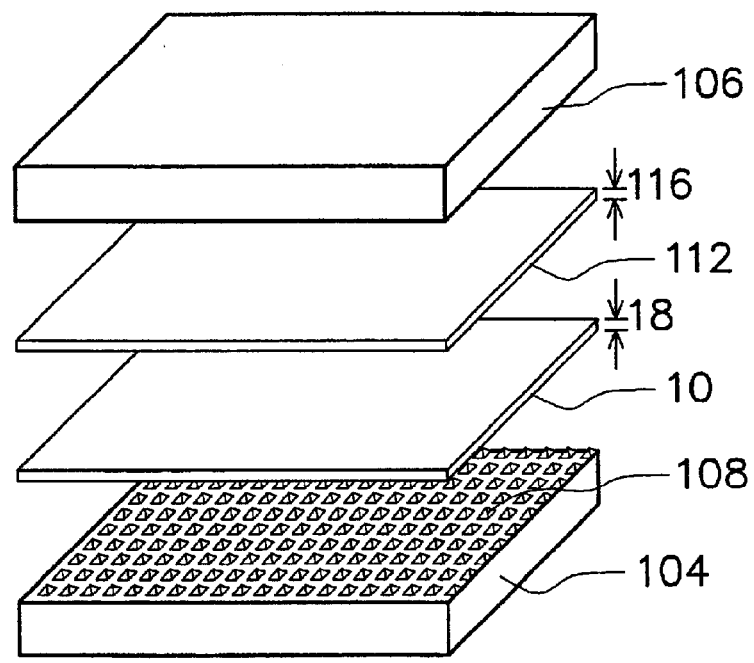
FIG. 3 is a diagram showing a schematic view of a film processing method according to another preferred embodiment of the present invention.

Referring to FIG. 3, a buffer layer 112 may be placed on the surface of the film 10 before performing the impression process, according to the actual requirement. The buffer layer 112 is placed between the film 10 and the transfer 106. The buffer layer 112 protects the film 10 against over-impression of the grain projections 108 with a higher hardness to avoid damage to the film 10 due to the punched through. Alternatively, the buffer layer 112 coupled with the film 10 can be offered for sale after impression.

The material of the film 10 described above includes metal foil, plastic film, alloy foil, or complex film, wherein the complex film includes one of following: different metal foils, metal coupled with plastic, metal coupled with paper and the like. The grain projections 108 are, for example, made of diamond or Borazon. The buffer layer 112 has hardness of the material lower than that of the transfer 106 and that of the grain projections 108 on the impresser. The material of the buffer layer 112 is, for example, selected from the following: paper, plastic, releasing paper, releasing film, adhesive coupled with releasing paper, adhesive coupled with releasing film or the like. In order to protect the film 10, a layer of protection material can be applied adjacent to the film 10 after the impression step. The structure of this protection layer is not shown in the figure. The material of the protection layer is, for example, selected from the following: plastic, tape, release agent or the like. The materials of the film 10, buffer layer 112, and protection layer mentioned above are retained in the following embodiments and are not repeated hereafter.

Figure 4:
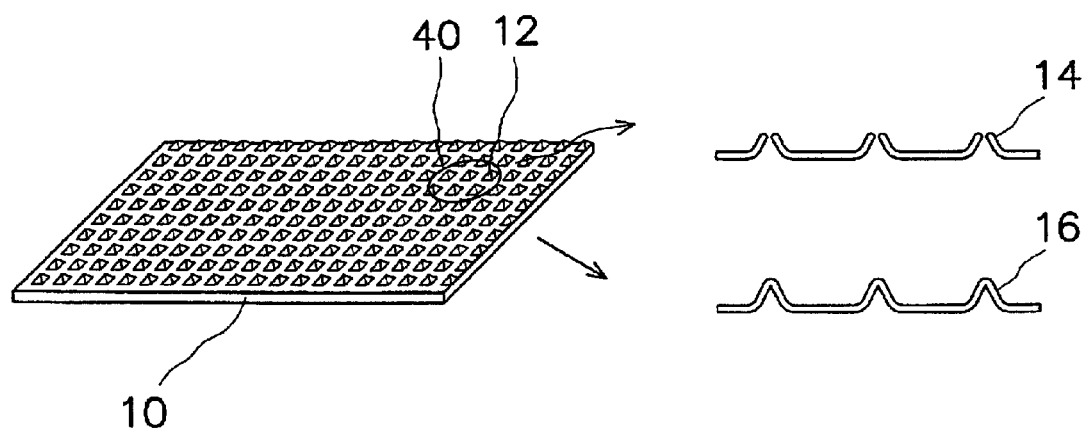
FIG. 4 is a diagram showing a schematic view of the formation of the protuberant structures on the film according to one preferred embodiment of the present invention.

The protuberant structures 12 formed on the film 10 have two forms. FIG. 4 is a cross-sectional view showing the partial enlarged diagram of the film 10. As shown in FIG. 4, one form of the protuberant structures 12 is protuberant shape 14 with an opening hole on the tip, for example, a volcanic shape, and the other form is protuberant shape 16 with no opening hole on the tip.

The protuberant shape of the protuberant structures 12 with an opening hole on the tip or without an opening hole on the tip can be formed individually by adjusting parameters of the process, which parameters include the height 114 of the grain projections 108 on the impresser 104, the thickness 18, the hardness and the extension property of the film 10, the hardness and thickness 116 of the buffer layer 112, and the pressure and temperature of the impressing step.

The position of the protuberant structures 12 formed on the film 10 is controlled by the position of the grain projections 108 of the impresser 104. Once the distribution of the grain projections 108 is determined, the distribution of the protuberant structures 12 of the film is fixed thereafter. Therefore, the size, the density or sparse distribution, the well-mixed or graduation distribution of the protuberant structures 12 is entirely controlled by the size and the distribution of the grain projections 108. The figures of the invention merely illustrate grain projections having equal height and an even mix, but the invention is not limited thereof.

The invention provides a processing method having precision and high-quality reproduction adapted for production on a large scale.

The invention applying the squeezer 100 including the impresser 104 with grain projections 108 and the transfer 106 impresses the entire or a partial region of the film 10, so that the protuberant structures 12 having the protuberant shape 14 or 16 are formed in the impressed portion of the film 10.

Figure 5A:
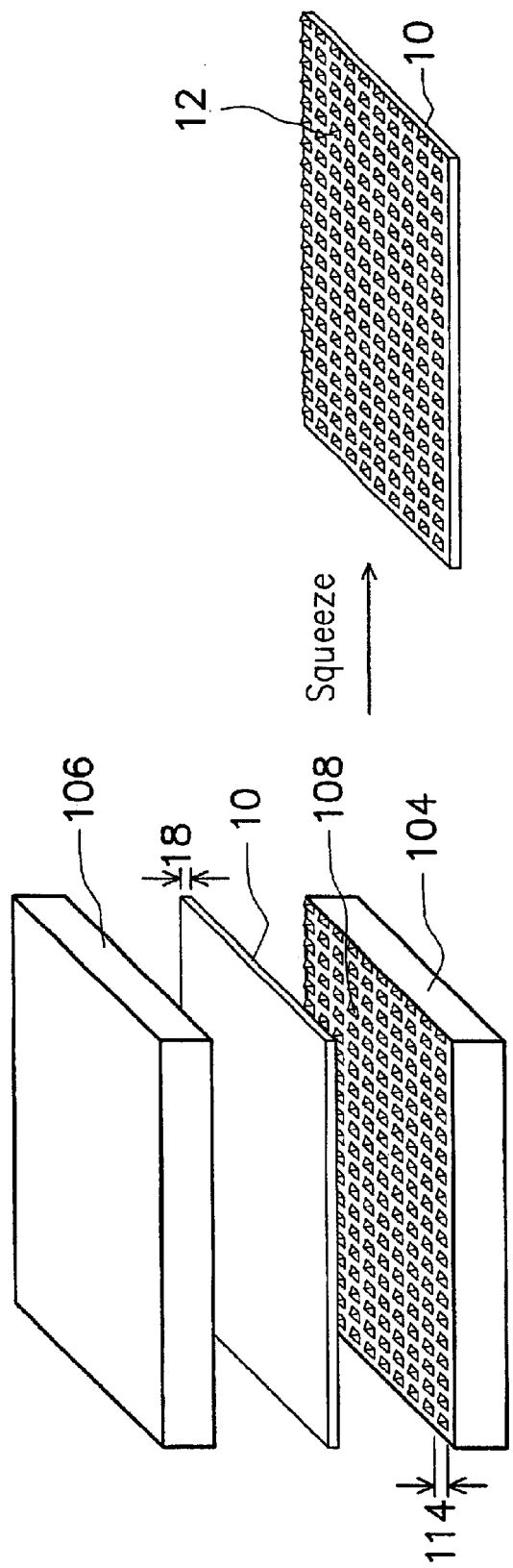
FIG. 5a is a diagram showing a schematic view of performing the impression processing on the whole surface of the film according to one preferred embodiment of the present invention.

Hereafter is the first preferred method for impressing the whole surface:

Referring to FIG. 5a, the method for performing the impressing step includes forming grain projections 108 on the whole region of the impresser 104, while the transfer 106 has a planar surface. During the process, the film 10 is placed on the surface of the impresser 104. Therefore, after impression, the protuberant structures 12 are formed throughout the whole region of the film 10 by the grain projections 108 of the impresser 104.

If the thickness 18 of the film 10 is less than the height 114 of the grain projections 108, or the hardness of the film 10 is less than the material of both the grain projections 108 and the transfer 106, then the protuberant structures 12 with the protuberant shape 14 having an opening on the tip are obtained by the impression. In contrast, if the thickness 18 of the film 10 is greater than the height 114 of the grain projections 108, or the film 10 has a good extension ability, then the protuberant structures 12 with the protuberant shape 16 without an opening on the tip are obtained after performing the impressing.

Hereafter is the second preferred method for impressing the whole surface:

Referring to FIG. 5b, another method for impressing the entire surface includes placing a buffer layer 112 against the film 10 and an impresser 104, wherein the whole surface of the impresser 104 is covered with grain projections 108. The protuberant structures 12 are formed on the entire surface of the film 10.

If the total thickness of the buffer layer 112 and film 10 is less than the height 114 of the grain projections 108, then the protuberant structures 12 with the protuberant shape 14 having an opening on the tip are obtained after the impression step. In contrast, if the total thickness of the buffer layer 112 and film 10 is larger than the height 114 of the grain projections 108, then the protuberant structures 12 with the protuberant shape 16 without opening on the tip are obtained after the impression step.

As described above, the invention provides methods for impressing the entire film 10 so that protuberant strictures 12 are formed throughout the film 10. However, the invention also provides methods for impressing a selected region of the film 10 and for forming protuberant structures 12 in only a selected part of the film 10. FIGS. 6a to 11 show methods for selectively impressing the film 10. In order to clarify the processing methods of the invention, spots in these figures are used to represent the grain projections 108 and the protuberant structures 12.

Figure 6A:
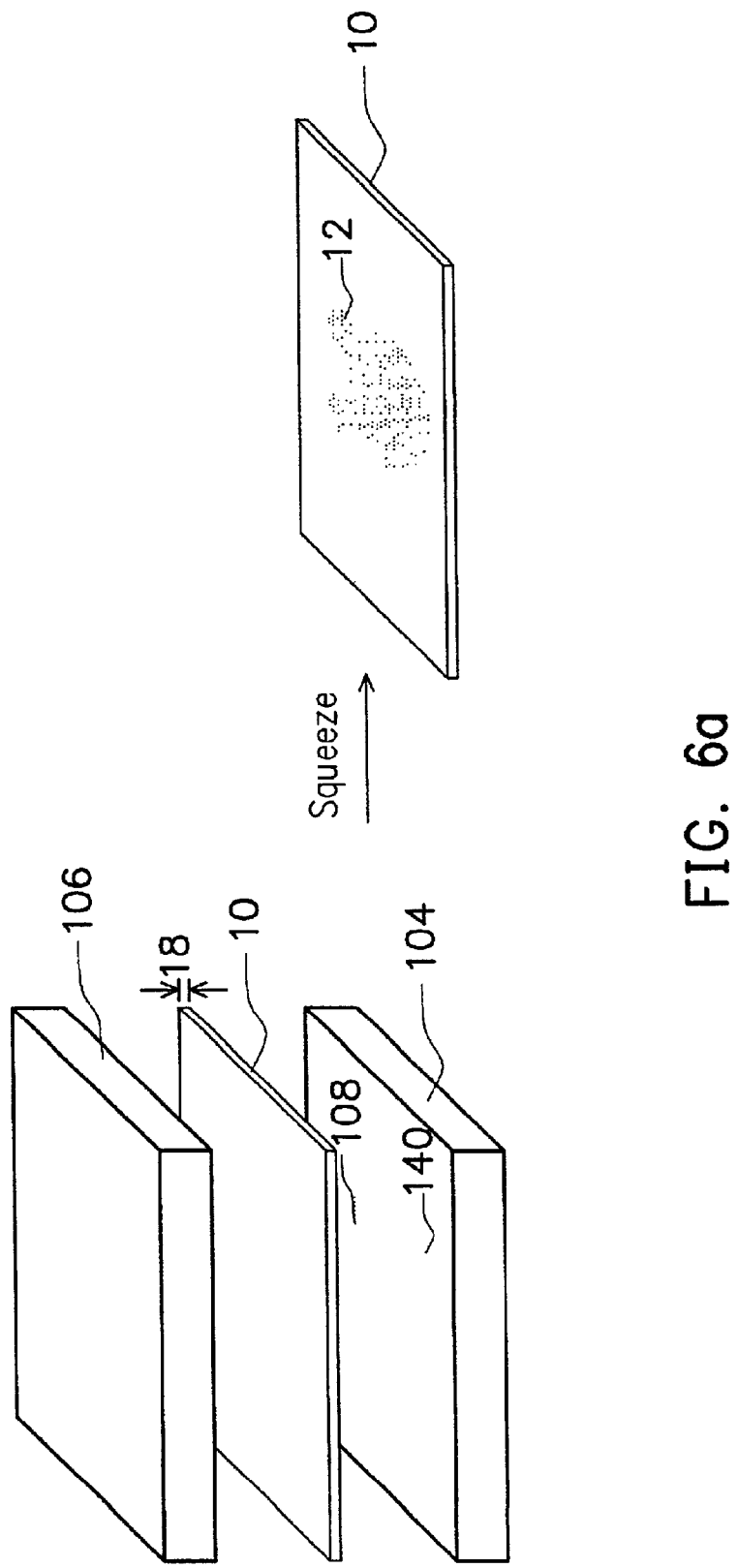
FIG. 6a is a diagram showing a schematic view of performing the impression processing on a selected region of the film according to one preferred embodiment of the present invention.

Hereafter is the first preferred method for impressing a selected region of the film:

Referring to FIG. 6a, the grain projections 108 having a selected shape, for example, region 140, are formed on the impresser 104, while the transfer 106 has a flat surface. If the film 10 is placed on the transfer 106 having the flat surface after which impression is performed by the impresser 104, then the protuberant structures 12 of the film 10 are formed in the selected region corresponding to the region 140 of the impresser 104. In this process, no protuberant structure is formed in any other region that does not correspond to the region 140 of the impresser 104. Thus, the surface of the film 10 is selectively impressed by the impression step.

If the film 10 has a hardness less than that of the grain projections 108 and that of the transfer 106, and if the film 10 has a thickness 18 less than a height 114 of the grain projections 108, then the protuberant structures 12 formed on the film 10 have a protuberant shape 14 with an opening on the tip. However, if the thickness 18 of the film 10 is greater than the height 114 of the grain projections 108, then the protuberant structures 12 formed on the film 10 have a protuberant shape 16 without an opening on the tip.

Figure 6B:
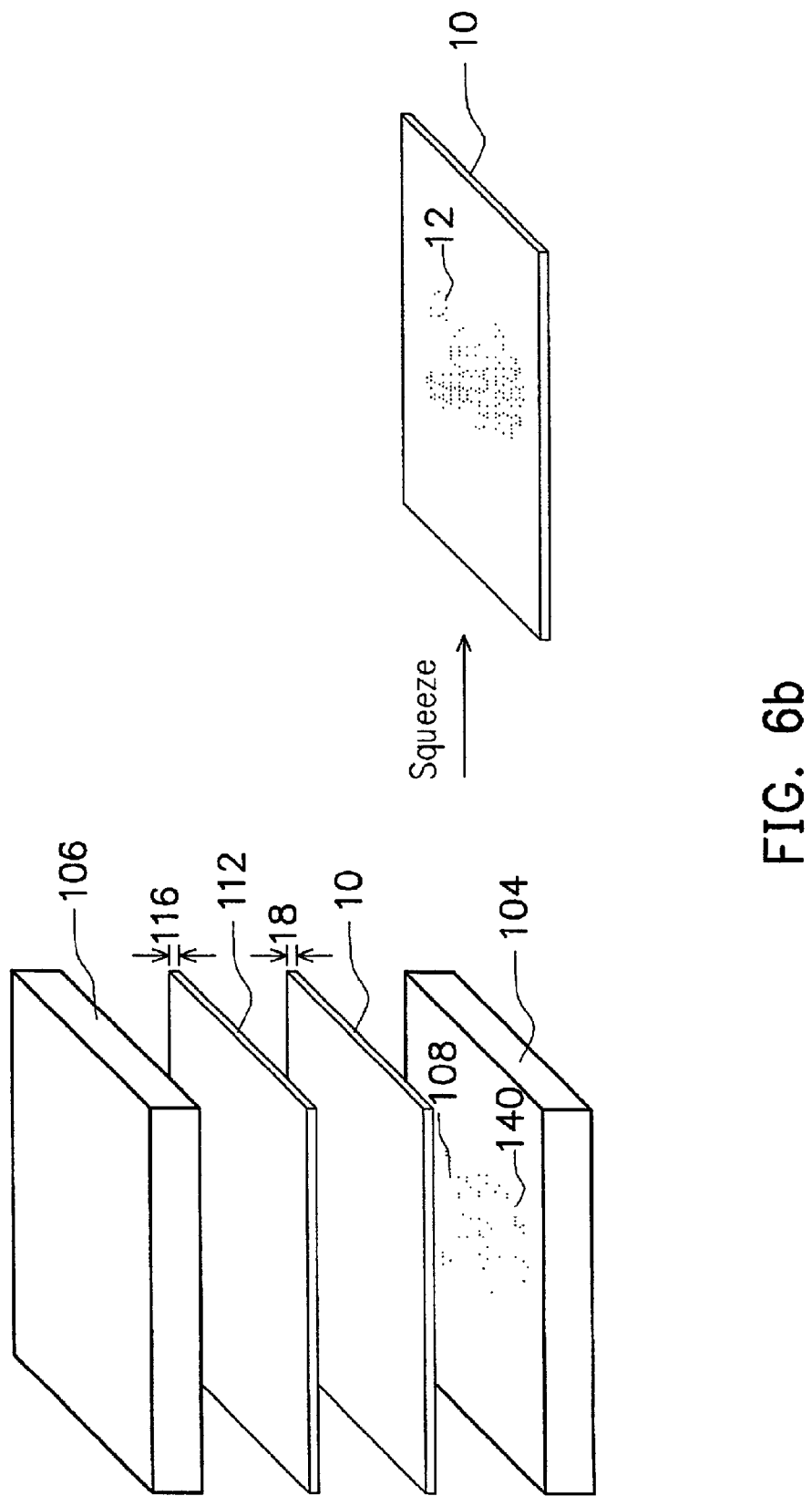
FIG. 6b is a diagram showing a schematic view of performing the impression processing on a selected region of the film according to another preferred embodiment of the present invention.

Referring to FIG. 6b, a buffer layer 112 may used in the space between the transfer 106 and film 10 during the process according to actual demand.

Figure 7A:
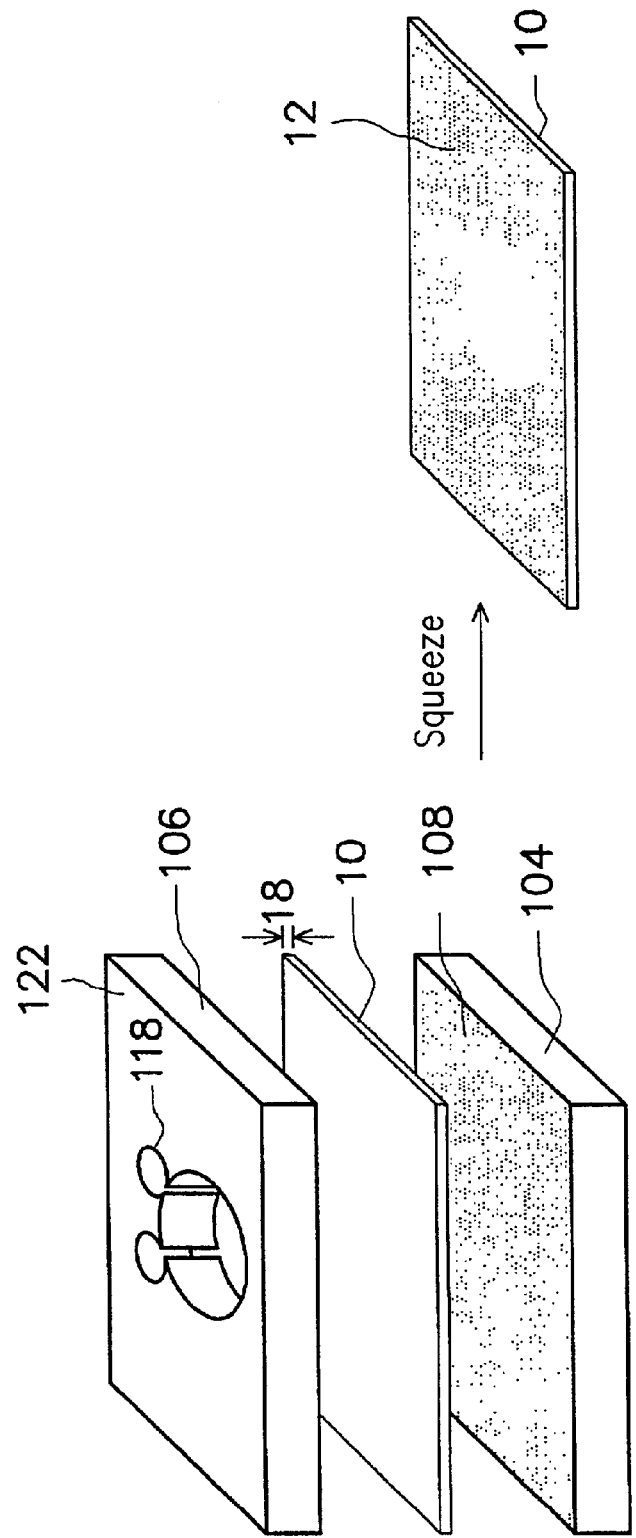
FIG. 7a is a diagram showing a schematic view of performing the impression processing on a selected region of the film by using a transfer having a selected region with an uniform depth of concave according to one preferred embodiment of the present invention.
Figure 7B:
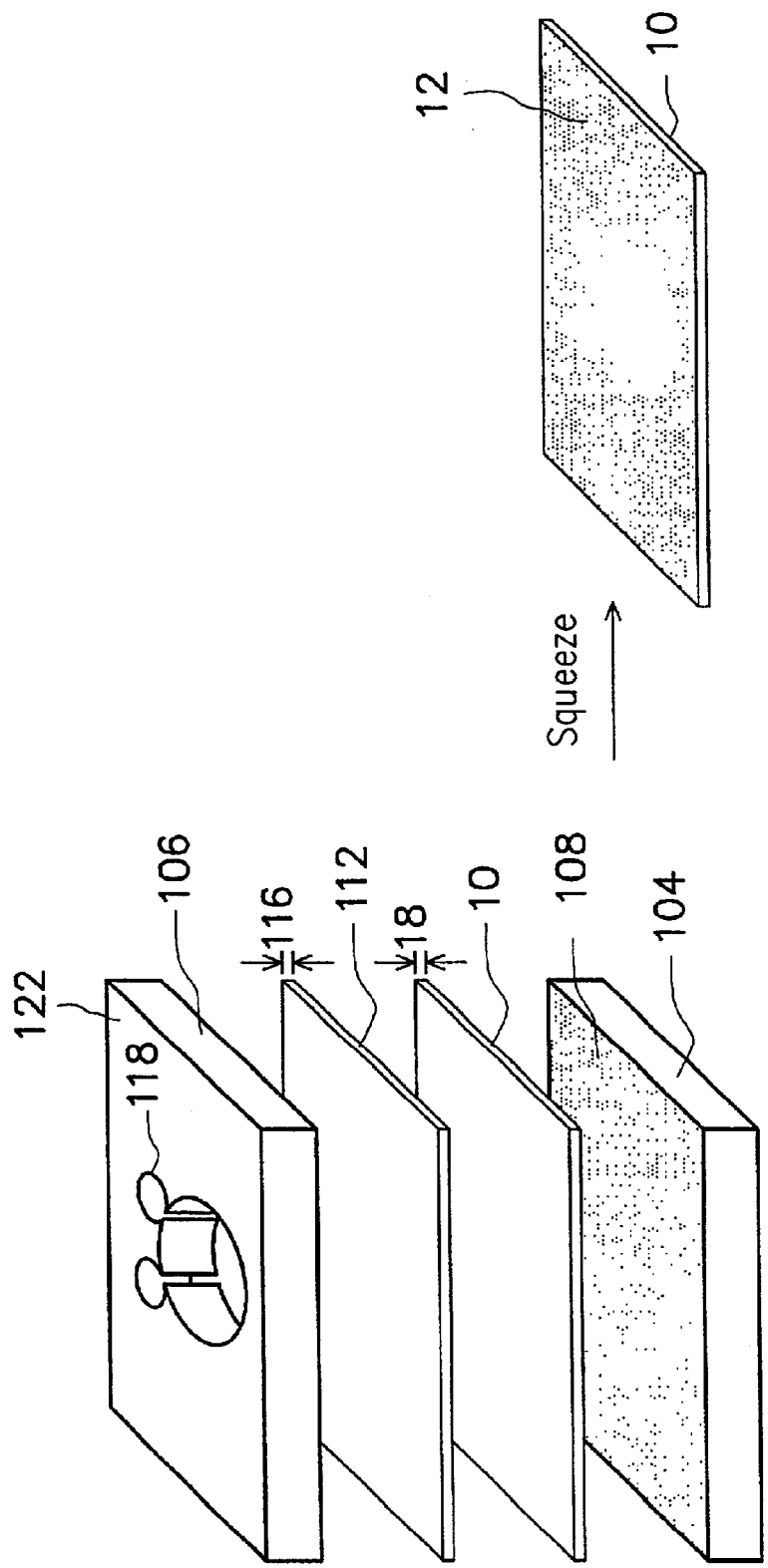
FIG. 7b is a diagram showing a schematic view of performing the impression processing on a selected region of the film by using a transfer having a selected region with an uniform depth of concave region according to another preferred embodiment of the present invention.
Figure 8B:
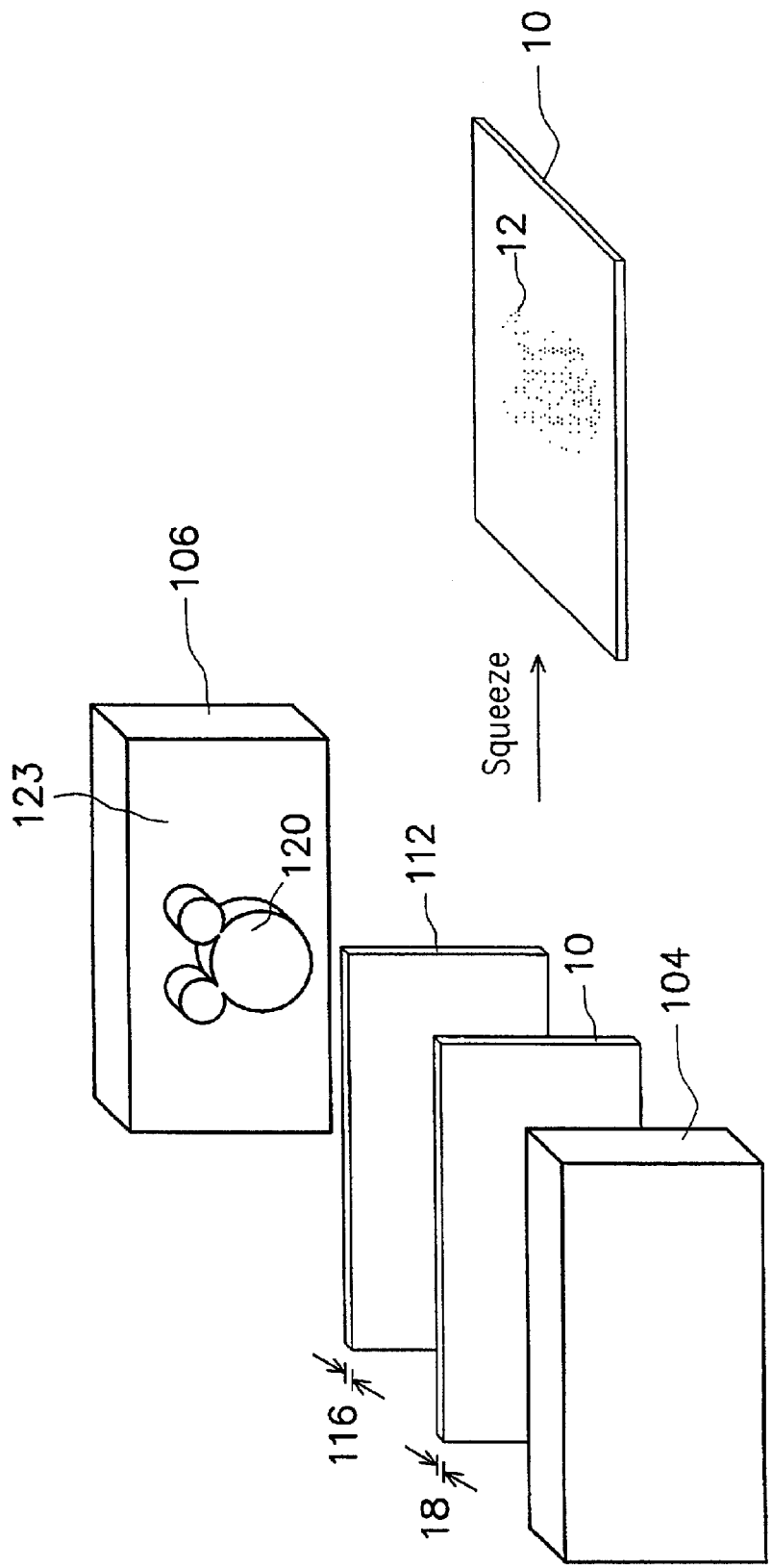
FIG. 8b is a diagram showing a schematic view of performing the impression processing on a selected region of the film by using a transfer having a region with an uniform high of convex region according to another preferred embodiment of the present invention.

Hereafter is a second preferred method for impressing a selected region of the film:

Referring to FIGS. 7a and 8a, another method for selectively impressing the film 10 includes the step of forming the grain projections 108 on the whole surface of the impresser 104; the transfer 106 is cut to form a selected concave region 118 (FIGS. 7a and 7b) or a selected convex region 120 (FIGS. 8a and 8b).

Referring to FIG. 7a, the film 10 is placed on the impresser 104, after which the film 10 is impressed by using the impresser 104 and the transfer 106 having the selected concave region 118. Protuberant structures 12 are formed on the surface of the film 10, wherein the surface of the film 10 corresponds to the region 122 of the transfer 106, but do not correspond to the selected concave region 118. At the same time, no protuberant structures are formed on the surface of the film 10 corresponding to the selected concave region 118.

Referring to FIG. 8a, in contrast, if the transfer 106 has the selected convex region 120, then after impression there are protuberant structures 12 formed on the surface of the film 10, wherein the surface of the film 10 corresponds to the selected concave region 120. Meanwhile, no protuberant structure is formed on the other surface of the film 10, wherein this surface of the film 10 corresponds to the region 123 of the transfer 106 which has no embossing structure formed thereon. By using the same method described above, the protuberant structures 12 can be controlled to have the protuberant shape 14 with opening or protuberant shape 16 without opening.

Referring to FIGS. 7b and 8b, a buffer layer 112 can be placed in the space between the film 10 and the transfer 106 according to the actual demands for processing the film 10.

Figure 9A:
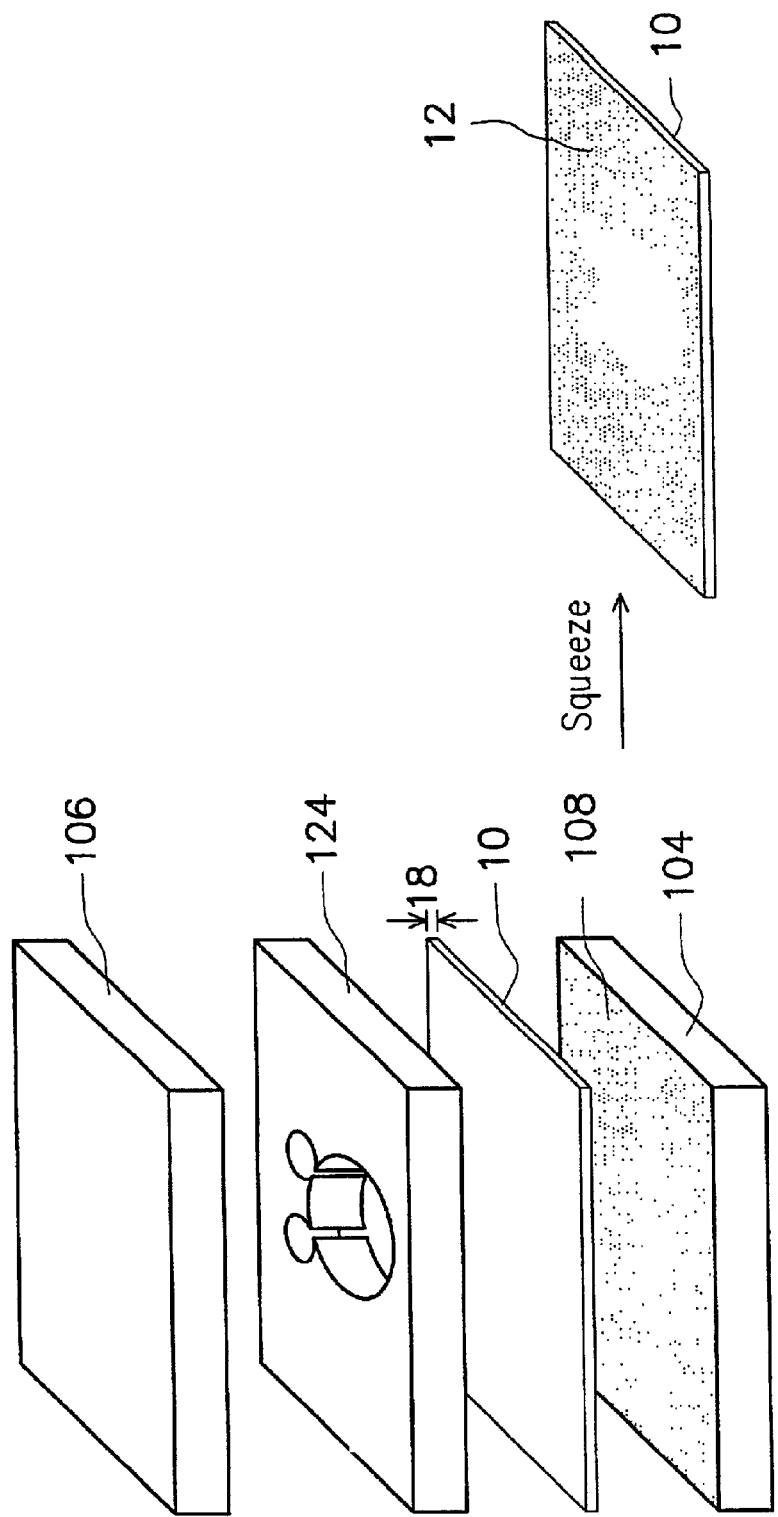
FIG. 9a is a diagram showing a schematic view of performing the impression processing on a selected region of the film by using a template according to one preferred embodiment of the present invention.

Hereafter is a third preferred method for performing the impressing step on a selected region:

Referring to FIG. 9a, another method for selectively impressing the film 10 includes the steps of forming the grain projections 108 on the whole surface of the impresser 104, and providing a transfer 106 having a flat surface. A template 124, such as the negative template illustrated in figures, is used in the process to selectively impress the film 10. The template 124 is first placed adjacent to the transfer 106, and then followed the film 10 is placed against the template 124. In other words, the template 124 is placed in the space between the transfer 106 and the film 10. Next, impression is performed by using the impresser 104 and the transfer 106 to form the desired protuberant structures 12 in the desired region on the film 10. The protuberant structures 12 can be controlled by adjusting the thickness of the template and its physical property, such as hardness, so that the protuberant structures 12 of the film 10 can have the protuberant shape 14 with opening on the tip or protuberant shape 16 without an opening on the tip. In other words, it is possible to control the surface structure of the finished film 10 by adjustable mentioned parameters of the impression step.

Figure 10:
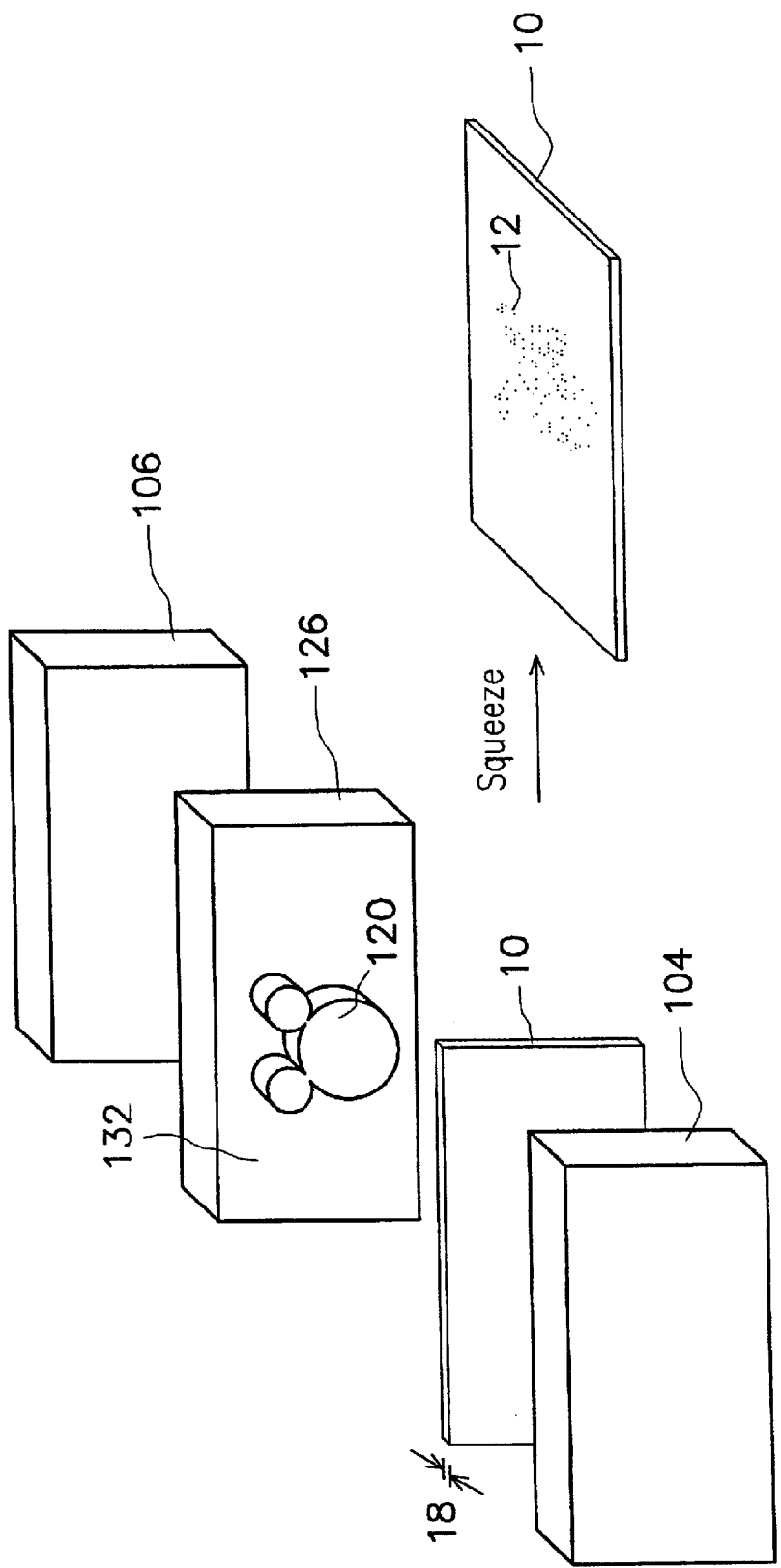
FIG. 10 is a diagram showing a schematic view of performing the impression processing on a selected region of the film by using a positive template according to one preferred embodiment of the present invention.
Figure 11:
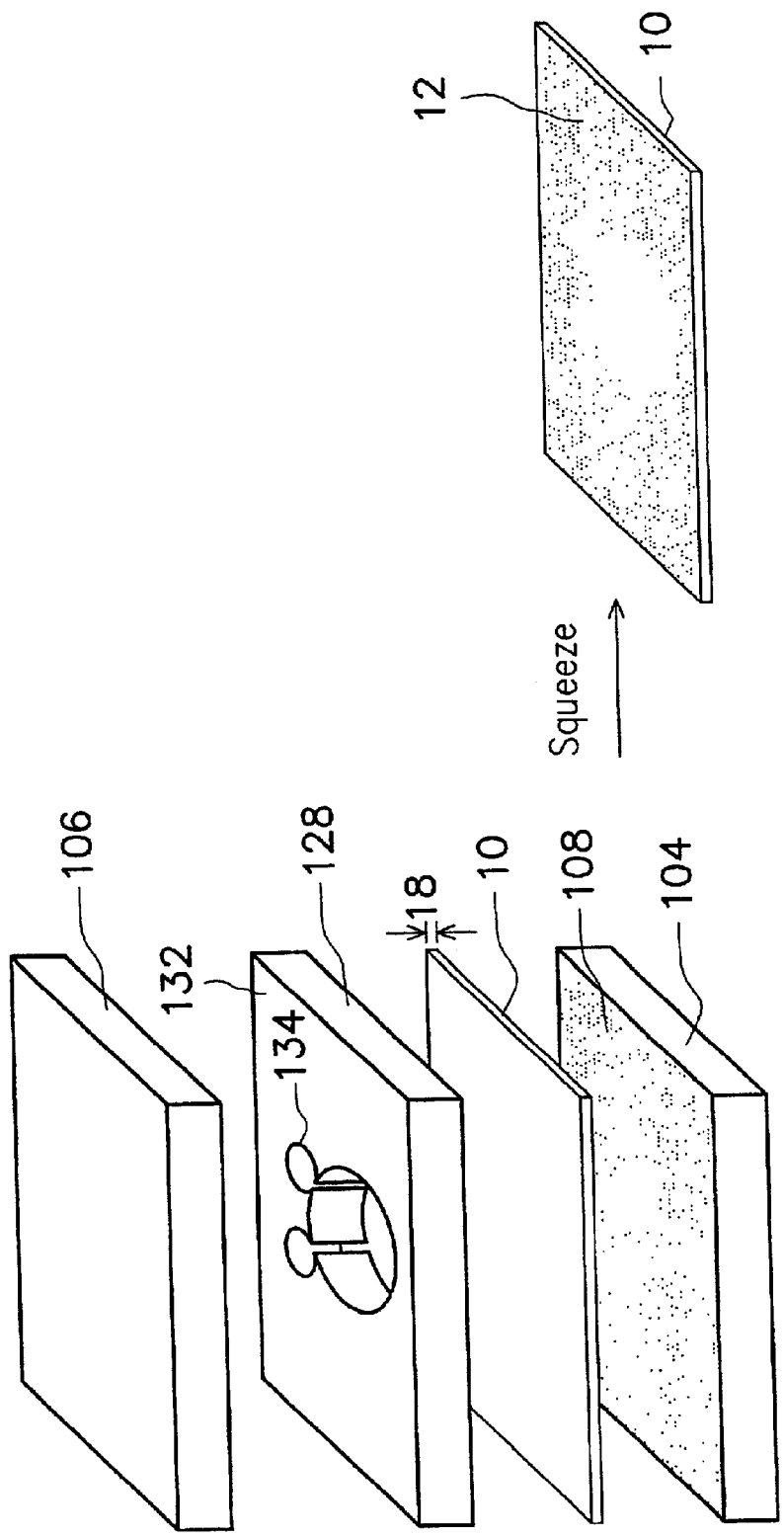
FIG. 11 is a diagram showing a schematic view of performing the impression processing on a selected region of the film by using a negative template according to one preferred embodiment of the present invention.

Referring to FIGS. 10 and 11, both the negative template 128 and the positive template 126 are suitable for the present invention. The positive template 126 is a template having a positive region 120 formed thereon. The negative template 128 is a template having a negative region 134 formed thereon.

Referring to FIG. 10, if the positive template 126 is used for the impression step, then, after impression, the protuberant structures 12 are formed on the surface of the film 10 corresponding to the positive region 120 of the positive template 126 by the grain projections 108. In contrast, no protuberant structures are formed on the surface of the film 10 corresponding to the region 132.

Referring to FIG. 11, if the negative template 128 is used in the impression step, then, after impression, the protuberant structures 12 are formed in the surface of the film 10 corresponding to a region 132 of the negative template 128, but not in the region corresponding to the negative region 134 of the negative template 128.

Figure 9B:
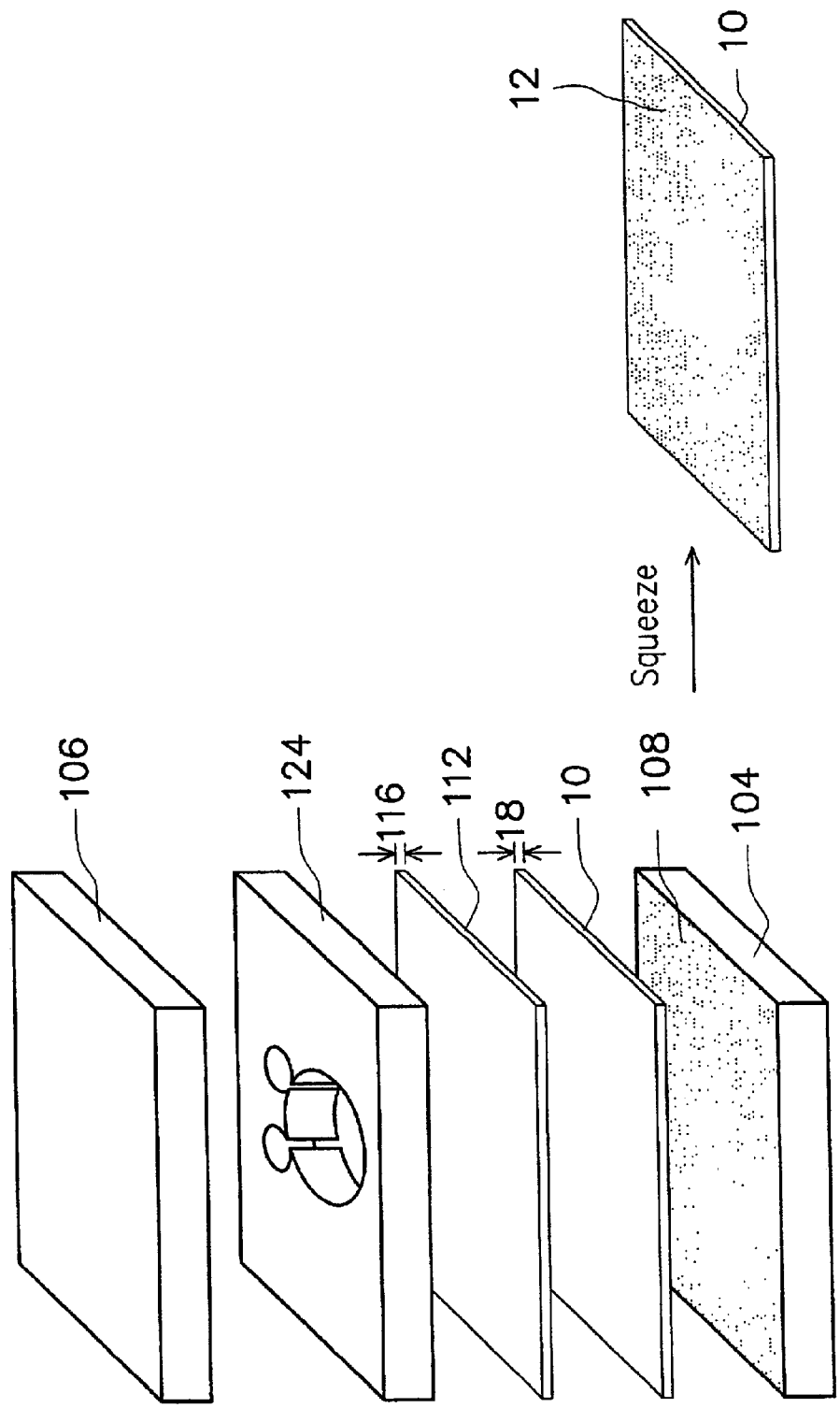
FIG. 9b is a diagram showing a schematic view of performing the impression processing on a selected region of the film by using a template according to another preferred embodiment of the present invention.

Referring to FIG. 9b, the method of using the template 124 for selectively impressing the film 10, a buffer layer 112 can be used in the space between the transfer 106 and the film 10 according to the actual demand for processing the film 10.

Figure 12:
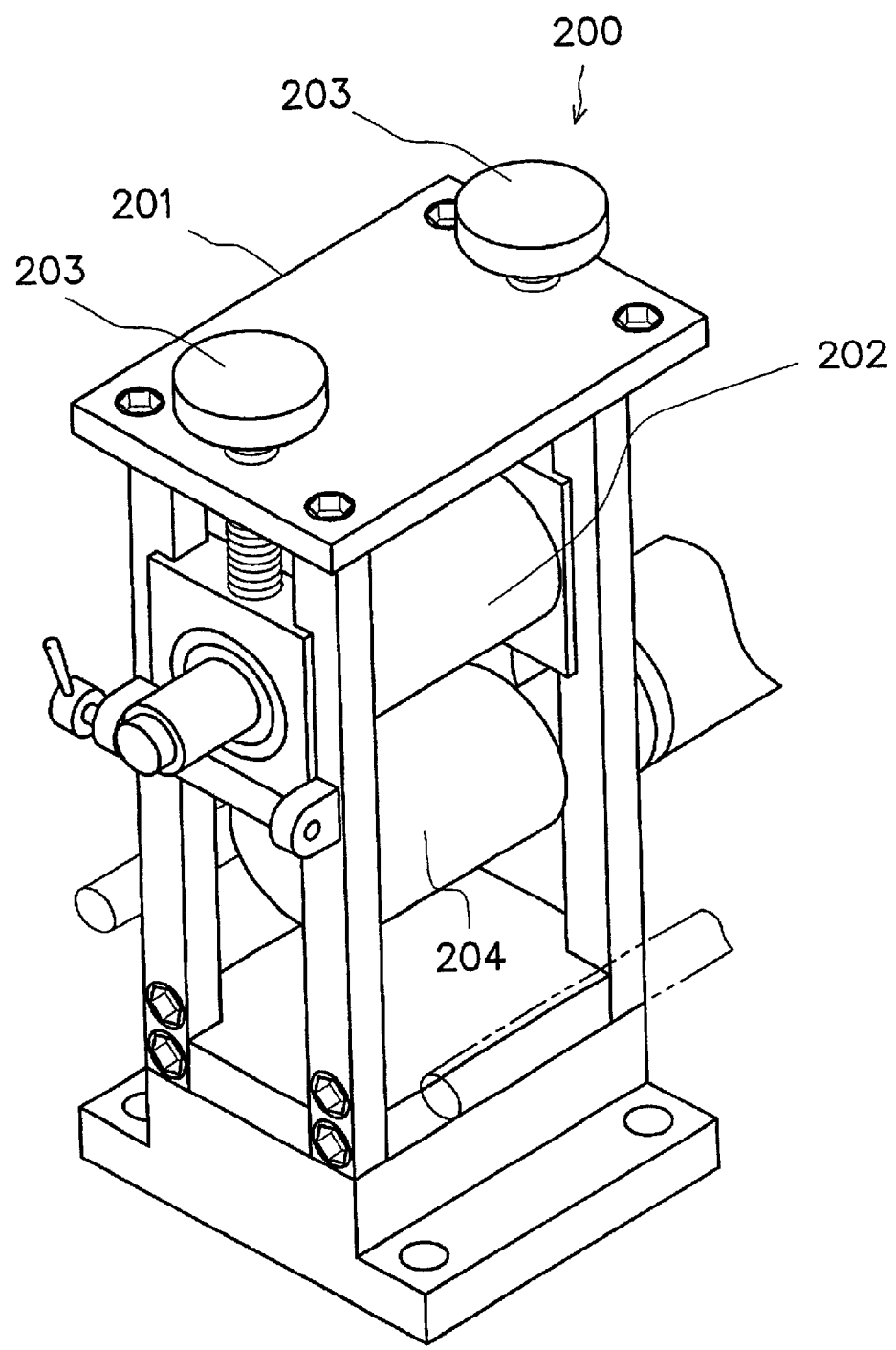
FIG. 12 is a diagram showing a schematic view of an apparatus used for processing the film according to the present invention.

Referring to FIG. 12, the squeezer 100 used in the invention is, for example, the apparatus 200 or the like. The apparatus 200 has been disclosed in U.S. Pat. No. 5,853,138.

The apparatus 200 disclosed by Lin includes a body 201, an transfer cylinder 202, two pressure adjusting screws 203 and an impression cylinder 204, wherein the function of the transfer cylinder 202 is equal to that of the transfer 106 and the function of the impresser cylinder 204 is equal to that of the impresser 104 described above.

Figure 13:
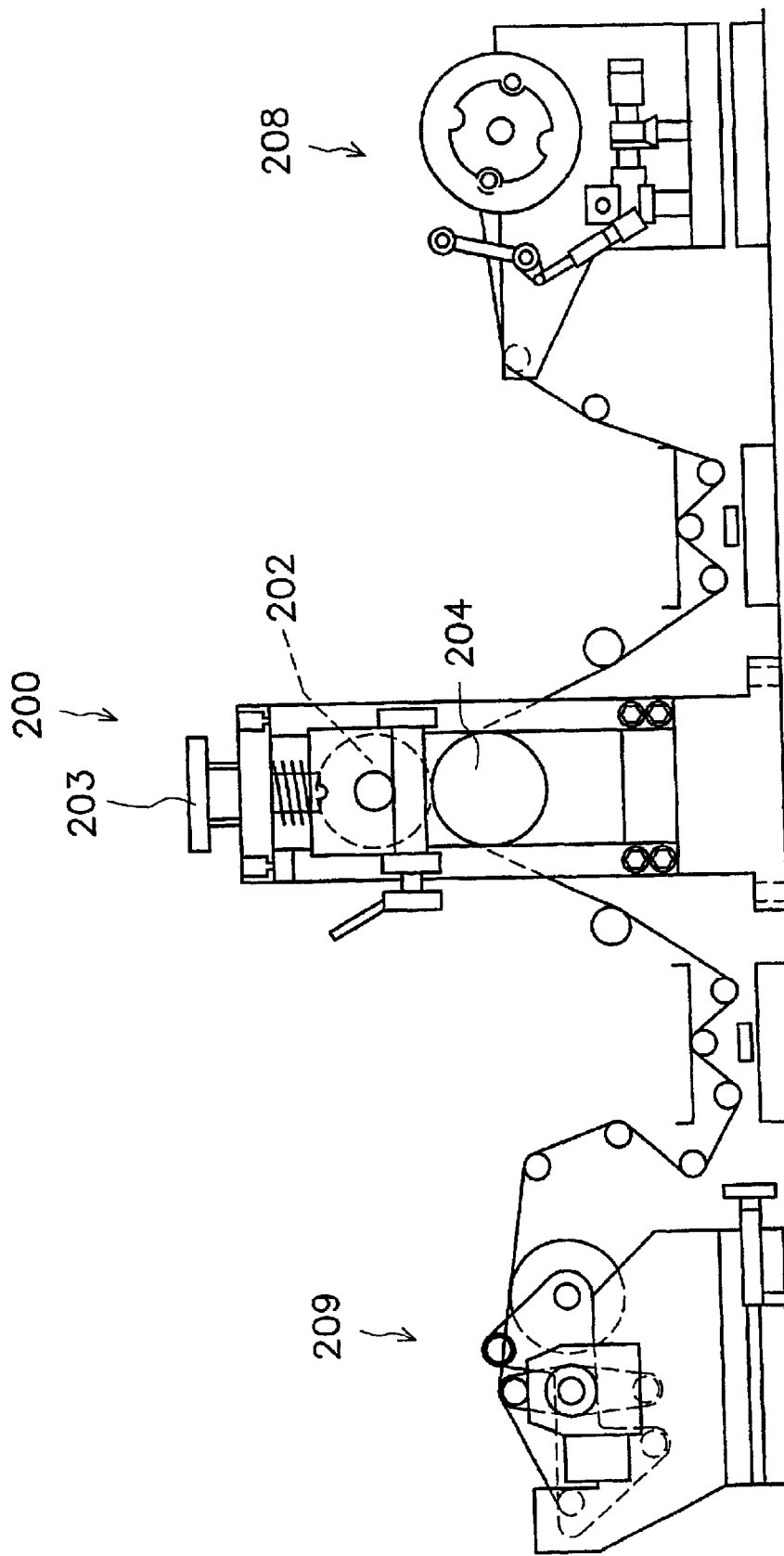
FIG. 13 is state diagram showing a schematic view of devices used for the processing the film according to the present invention.

Referring to FIG. 13, during the processing procedure of the film 10, the apparatus 200 is employed in the space between the output structure 208 and the rolling structure 209. The film 10 is transferred from the output structure 208, i.e. unwind station, after which it is passed between the transfer cylinder 202 and the impression cylinder 204 for impression. Pressure adjusting screws 203 control the impressing pressure applied to the film 10.

As described above, the size, structure, the dense or sparse distribution, and the well-mixed or graduation distribution of the protuberant structures across the surface of impressed film 10 is completely controlled by the size, structure and the distribution of the grain projections along the surface of impresser 104 and the use of the buffer layer. Therefore, the invention provides a processing method having fine control and high-quality of reproduction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing a film, comprising:

providing a film; and selecting a region of the film and performing an impression step to form a plurality of protuberant structures on the region of the film, wherein the impression step is performed by a squeezer including an impresser and a transfer and a template, the impresser having a plurality of grain projections formed thereon, the template having a pattern corresponding to the region of the film for forming the protuberant structures on the region of the film by impression is placed between the film and the transfer.

2. The method according to claim 1, wherein the grain projections are formed on the impresser and by using the template having a pattern corresponding to the region of the film, such that after impression the protuberant structures are formed in the region of the film by the impresser and the transfer, which has a flat surface.

3. The method according to claim 1, wherein the template includes a negative template or a positive template.

4. The method according to claim 1, wherein the grain projections are composed of diamond particles or Borazon particles.

5. The method according to claim 1, wherein the film is made of a material chosen from the group consisting of metal, plastic, alloy, and complex film, wherein the complex film is composed of one of following including different metal foils, metal coupled with plastic, and metal coupled with paper.

6. The method according to claim 1, wherein the protuberant structures have a protuberant shape with an opening or without an opening.

7. The method according to claim 1, further providing a buffer layer between the film and the template.

8. The method according to claim 7, wherein the buffer layer is made of a material chosen from the group consisting of paper, plastic, releasing paper, releasing film, adhesive coupled with paper, and adhesive coupled with releasing film.

9. The method according to claim 1, after the impression step is performed, further including the step of placing a protection layer on the top of the film, wherein the protection layer is made of organic material, inorganic material, or metal.

* * * * *